(12) United States Patent
Haran

(10) Patent No.: US 6,606,192 B2
(45) Date of Patent: *Aug. 12, 2003

(54) ASTRONOMICAL VIEWING EQUIPMENT

(76) Inventor: Jeffrey M Haran, 38460 Timpanogas Cir., Fremont, CA (US) 94536

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 172 days.

(21) Appl. No.: 09/285,619

(22) Filed: Apr. 3, 1999

(65) Prior Publication Data

US 2001/0022686 A1 Sep. 20, 2001

(51) Int. Cl.[7] .............................................. G02B 23/00
(52) U.S. Cl. ........................ 359/409; 359/399; 359/480; 359/431
(58) Field of Search ................................ 359/399–430, 359/471, 479–481; 351/41, 47, 55, 158; 250/203.1, 203.6

(56) References Cited

U.S. PATENT DOCUMENTS

| 2,848,924 | A | * | 8/1958 | Potez | 359/411 |
| 3,051,046 | A | * | 8/1962 | Thompson | 359/411 |
| 4,893,919 | A | * | 1/1990 | Nightingale | 359/480 |
| 5,282,086 | A | * | 1/1994 | Goldstein | 359/410 |
| 5,479,293 | A | * | 12/1995 | Reed | 359/409 |

FOREIGN PATENT DOCUMENTS

| CH | 576152 | * | 5/1976 | 359/409 |

* cited by examiner

Primary Examiner—Thong Nguyen
(74) Attorney, Agent, or Firm—Hans J. Von Der Pfordten

(57) ABSTRACT

An astronomical viewing instrument with a helmet-mounted optical assembly comprising a pair of binocular tubes, each with an objective lens, attached to a base plate. The base plate is connected via a first hinge to the helmet worn by the viewer. The binocular tubes are also attached to a first pair of apertures in a mirror housing which has a second pair of apertures with threaded tees, at an angle relative to the first pair, for connection to a pair of prism housings ending in eyepieces for the viewer. The prism housings provide for a parallel offset such that their individual rotation around the mirror housing tees changes the distance between the eyepieces to match the distance between the pupils of the viewer. The first hinge serves to accommodate different head sizes of viewers and allows to adjust the weight, via the cushioned eye-pieces, on the eyes of a viewer. An adjustable counterweight, connected to the back of the helmet, permits to shift the center of gravity of the viewing equipment over the spine of the viewer for comfort. The angle between first and second apertures of the mirror housing is fixed at about 60 degrees relative to the horizon, permitting the viewer to observe astronomical objects between about 30 degrees of inclination and the zenith by slight up and down tilting of his head relative to the horizon.

16 Claims, 4 Drawing Sheets

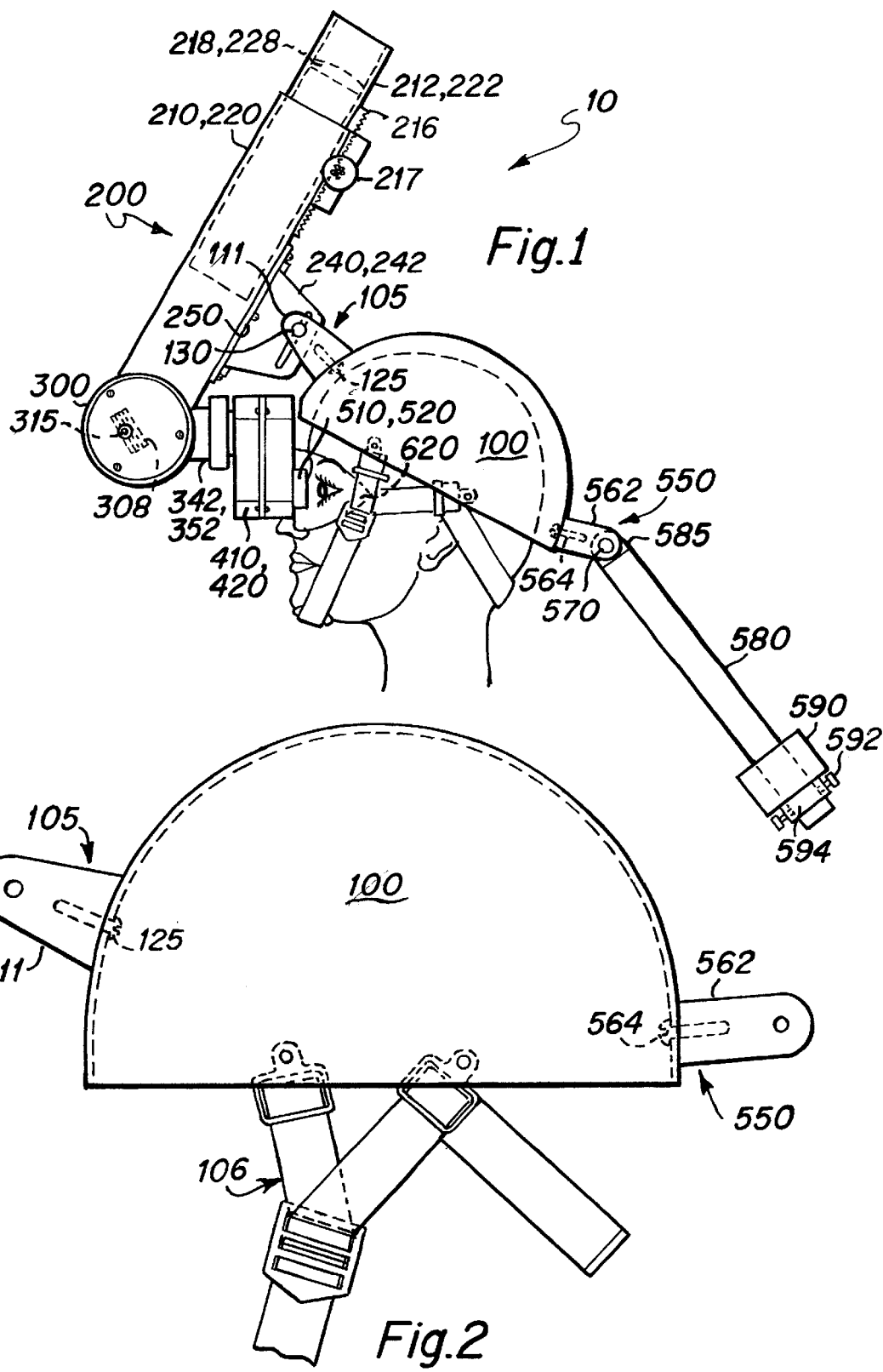

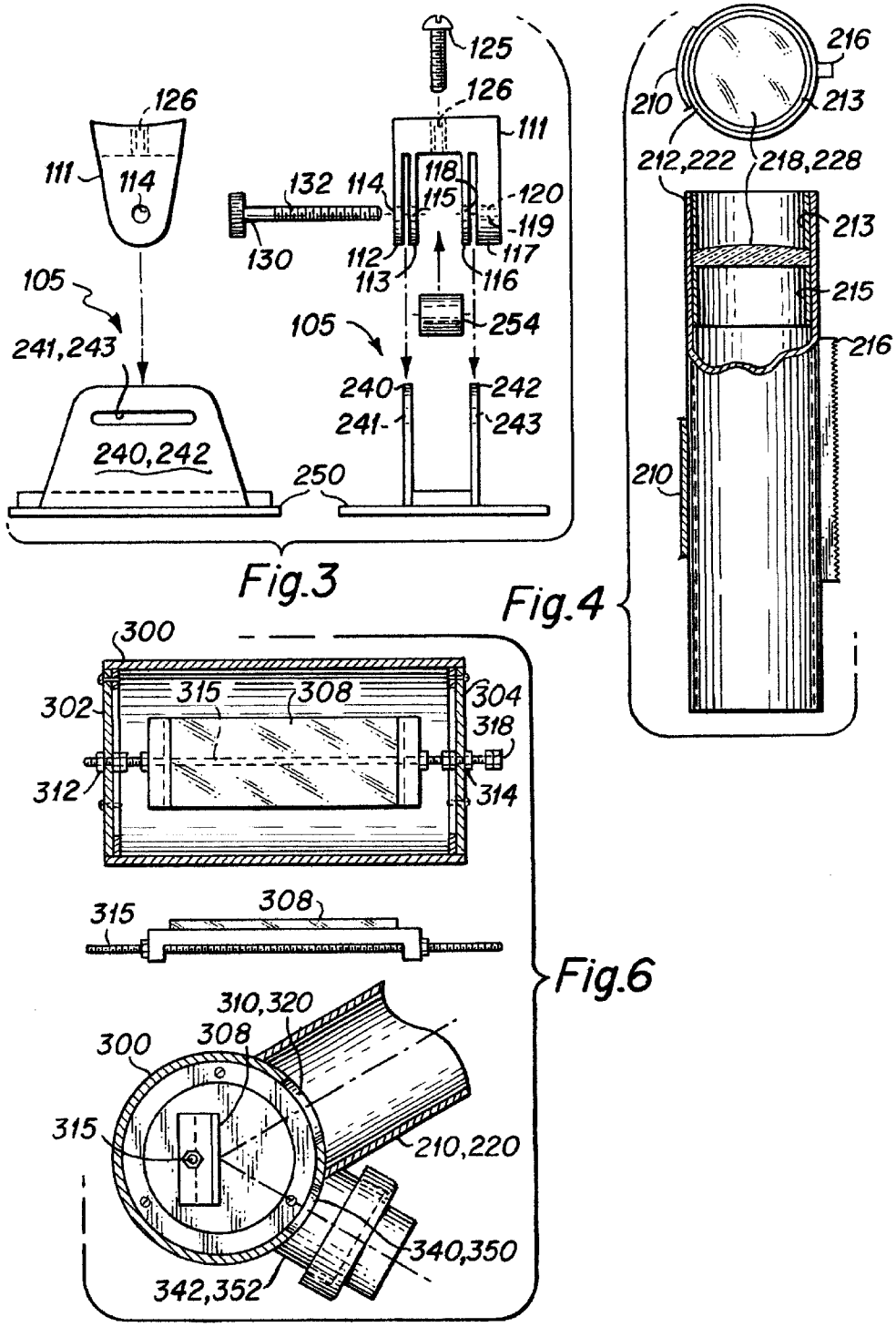

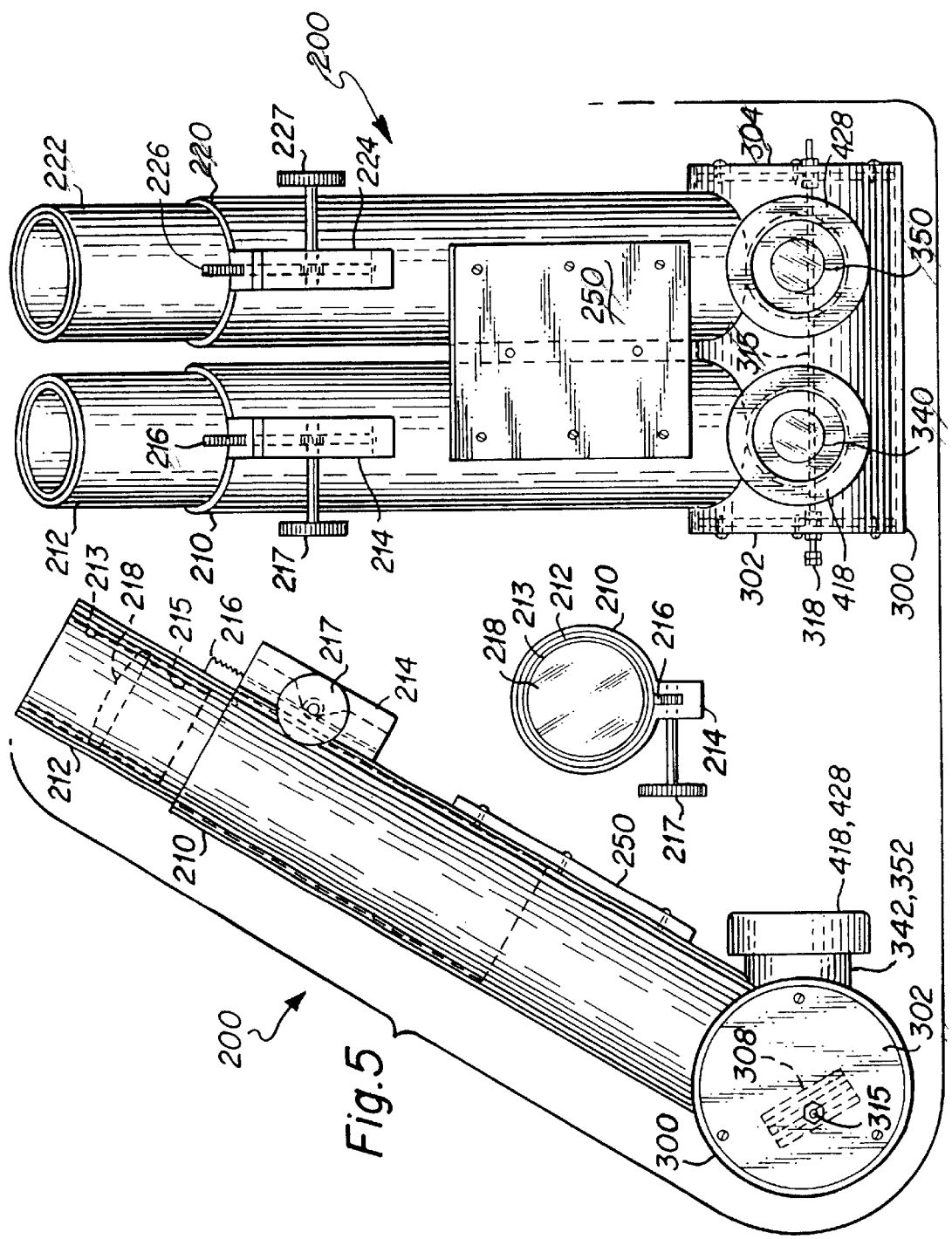

ASTRONOMICAL VIEWING EQUIPMENT

Figure 7:
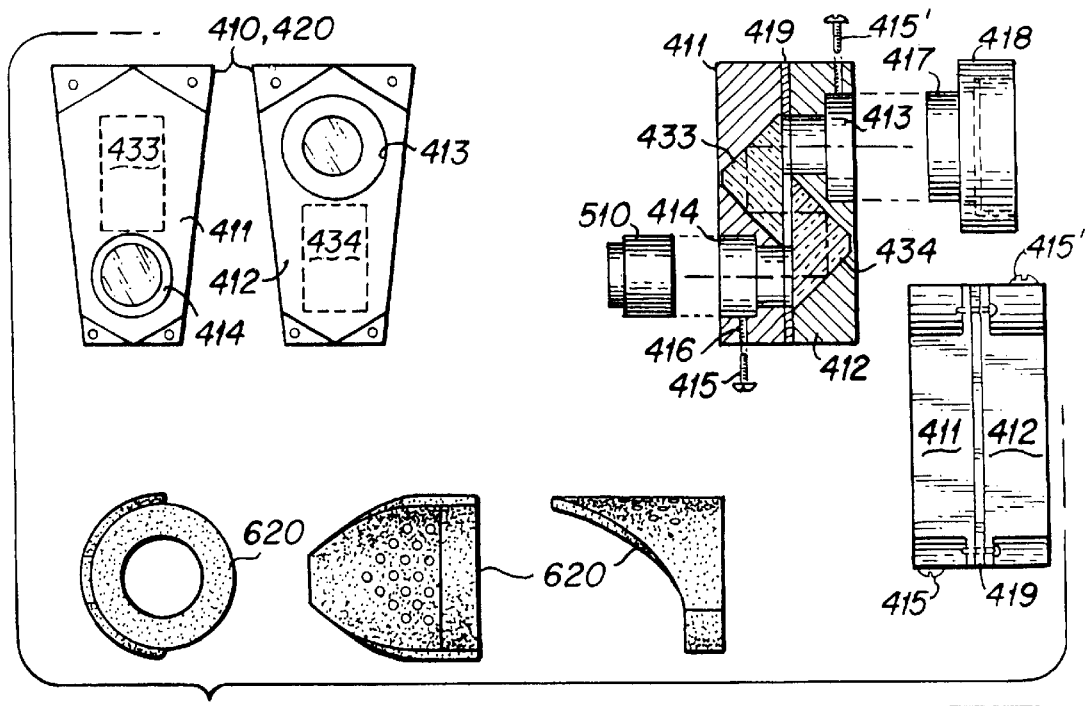

The present invention encompasses a helmet-mounted binocular astronomical viewing equipment (10) for viewing stars and other astronomical objects appearing in the night sky at an arbitrary angle of inclination in reference to the horizon. The sky area from the horizon to an inclination of about 30 degrees is less suited for observation because of ambient light sources and atmospheric conditions. The point of emphasis is the creation of a band of comfortable viewing angles from about 30 degrees to the zenith attainable by a slight forward and backward tilting of the head. The invention effects the prevention of fatigue and inconvenience by maintaining a normal approximately horizontal head position. The equipment 10, as seen in FIG. 1, comprises a helmet 100, and a binocular optical assembly 200, comprising a pair of optical pathways, realized as outer tubes 210 and 220, mounted on a baseplate 250 and containing inner tubes 212 and 222 with objective lenses 218 and 228, respectively. The baseplate is attached to helmet 100 via a first hinge assembly 105. A mirror housing 300 holding mirror 308 is attached to tubes 210 and 220. Optical assembly 200 also comprises a pair of prism housings 410 and 420 attached to mirror housing 300 and carrying eyepieces 510 and 520, respectively. Each eyepiece is situated directly in front of a respective one of the eyes of the viewer for conveying images. A counter weight 590 is slidingly attached to lever 580 which is rotationally affixed to the back of helmet 100 by a second hinge assembly 550. Except for mirror housing 300 the optical components are present in equivalent symmetrical binocular pairs, identified mostly as XYZ (X10) and X(Y+1)Z (X20), for left and right eyes, respectively, with the description for one side analogously applying to the other side. In the drawings only one side may be detailed.

FIG. 2 illustrates helmet 100 carrying straps 106 for fastening to the head of a viewer. Hinge bracket 111 of first hinge assembly 105 is fastened to the forehead portion of helmet 100 by bolt 125, and a hinge 562 of second hinge assembly 550 is fastened to the back of helmet 100 by bolt 564.

FIG. 3 shows a cross-section of hinge 111 of first hinge assembly 105 which is fastened to helmet 100 by bolt 125 fitting into threaded hole 126. Hinge 111 has first dual brackets 112, 113 with holes 114 and 115, respectively, and second dual brackets 116, 117 with holes 118 and 119, respectively. Holes is 114, 115, 118 and 119 are coaxial for accommodating a bolt 130 with a thread 132. Hole 119 has a thread 120 for engaging thread 132. A spacer 254 fits between inner brackets 113 and 116. Base plate 250 carries third dual brackets 240 and 242 of hinge assembly 105 with elongated slots 241 and 243, respectively. The fastening of assembly 200 to helmet 100 is accomplished by inserting bracket 240 between first dual brackets 112 and 113 while concurrently inserting bracket 242 between second dual brackets 116 and 117. Subsequently bolt 130 is pushed through holes 114, 115, spacer 254 and hole 118 and thread 132 of bolt 130 is engaged in the thread 120 of hole 119, thus completing hinge assembly 105 for providing pivoting around its axis and rotational adjustment. When bolt 130 is tightend, each one of dual brackets 240 and 242 is squeezed between its proximate parts of hinge 111 and its proximate part of spacer 254 thus achieving a frictional press fit obstructing the rotation of assembly 200. The combination of hinge 111, dual brackets 240 and 242 and bolt 130 with spacer 254 serves to secure optical assembly 200 against sidewise tilting with respect to the symmetry plane of helmet 100 but allowing assembly 200 to be slightly swiveled left and right for a proper lining up with the pupils of the viewer.

FIG. 4 depicts inner tube 212, coaxial to outer tube 210 and carrying an objective lens 218 which is secured in place by mounting rings 213 and 215. Inner tube 222 fitting inside outer tube 220 is designed analogously with objective lens 228 and mounting rings 223 and 225.

FIG. 5 shows a pinion 214 attached to outer tube 210 and a rack 216 attached to inner tube 212 and operated by knob 216 which allows an anal movement of lens 218, held by inner tube 212, relative to outer tube 210 which is fastened to mirror housing 300, to achieve a change in distance from lens 218 to mirror 308 in mirror housing 300 and therefore a change in the length of the light path to facilitate individual focusing for each eye of the viewer. Pinion 214, rack 216 and knob 217 on tube 210 have a corresponding pinion 224, rack 226 and knob 227 on tube 220, respectively. Outer tubes 210 and 220 are fastened to mirror housing 300.

FIG. 6 shows a cross-section of cylindrical mirror housing 300 which carries a first pair of apertures 310 and 320 to which outer tubes 210 and 220 are fastened, respectively. Mirror housing 300 also carries a second pair of apertures 340 and 350 with threaded tees 342 and 352 serving as "pipe stubs" for the attachment of prism housings 410 and 420 (see FIG. 7), respectively. The angle between the first pair of apertures 310, 320 and the second pair of apertures 340, 350, referenced to the longitudinal axis of mirror housing 300, is less than 180 degrees. In the present best mode description this angle is less than 90 degrees, in reality about 60 degrees. Circular side walls 302 and 304 of mirror housing 300 contain perforations with bearings 312 and 314, respectively, excentric to the axis of mirror housing 300 for holding a rod 315 attached to and parallel to the longer axis of mirror 308. One side of rod 315 protrudes a small distance to one side (the right side in FIG. 6) to accommodate a knurled knob 318 for allowing a viewer to adjust the rotary position of mirror 308.

Figure 8:
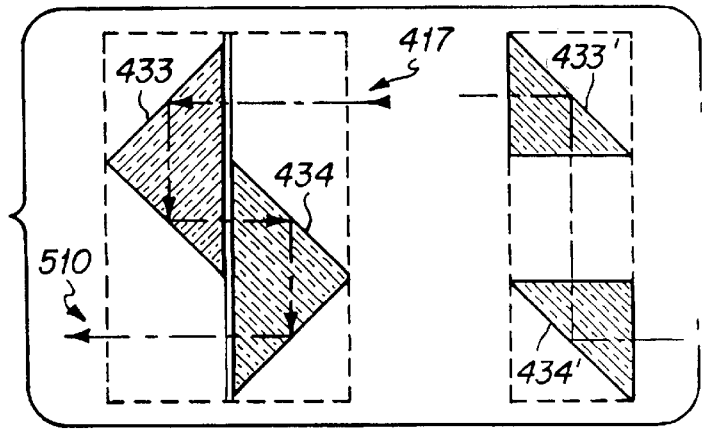

FIG. 7 with reference to FIG. 5 depicts prism housings 410 and 420 which are rotationally adjustably attached to threaded tees 342 and 352 of mirror housing 300, respectively The following description of prism housing 410 for one eye has its corresponding parts in prism housing 420, with the middle designation Y of XYZ replaced by X(Y+1)Z for the other eye. Prism housing 410 comprises a front exterior 411, close to the eye of the viewer, a midsection 419 and a rear exterior 412, close to mirror housing 300, which are held together by a plurality of screws. The midsection serves to provide separation between the prisms. Front exterior 411 contains an outlet, with an outlet axis, as cavity 414 for eyepiece 510, which is held in by screw 415 inserted into threaded hole 416. Analogously screw 415' holds flange 417 in cavity 413. Rear exterior 412 contains an inlet with an inlet axis, as cavity 413 for flange 417. Flanges 417,427 with threaded collars 418,428 engaging threaded tees 342, 352 provide rotatable connections between of mirror housing 300 and prism housings 410,420, respectively (FIG. 5). Most importantly, as depicted in FIG. 8, housing 410 holds two rectangular prisms 433 and 434 for generating an optical offset. The optical offset and the rotation of prism housings 410 and 420 around tees 342 and 352 of mirror housing 300 allows the adjustment of the distance between eyepieces 510 and 520 to the distance between the pupils of the viewer. FIG. 8 shows two versions of an optical offset using rectangular prisms. In general terms the proper reflecting surface arrangement for an optical offset requires that light leaving the outlet is parallel, but not coaxial, to the light entering the inlet and propagating in the same direction after reflections on pairs of parallel reflecting surfaces. In the present version light enters and leaves the parallel, facing and offset hypotenuses of the prisms and is reflected by the the sides opposite the hypotenuse. A beam of light from mirror 308 via flange 417 enters prism 433, is reflected twice and exits into prism 434 where it is also reflected twice and exits via eyepiece 510 into an eye of the viewer, thus providing a parallel offset optical path from mirror 308 to eyepiece 510. In another version light enters and leaves parallel sides opposite the hypotenuses of prisms 433' and 434' and is reflected on the hypotenuses with the other pair of sides opposite the hypotenuse facing each other. In the present invention respective triangular surfaces of both prisms 433 and 434, in this design nonactive, are coplanar. Their hypotenuses are shifted, facing each other parallel and are separated by a small gap. Each eyepiece 510, 520, as FIG. 7 shows, is surrounded by a ringlike foam shield 620 with lateral perforation attached to cushion the weight of the assembly 200 pushing against the bones structure around an eye of the viewer. In order to accommodate different head and forehead sizes and different eye levels of viewers, the dual bracket slots 241, 243 with a loosening and retightening of bolt 130 (in FIG. 3) allow for adjusting the press fit of hinge assembly 105 to secure the position of assembly 200 relative to the eyes of the viewer.

Figure 9:
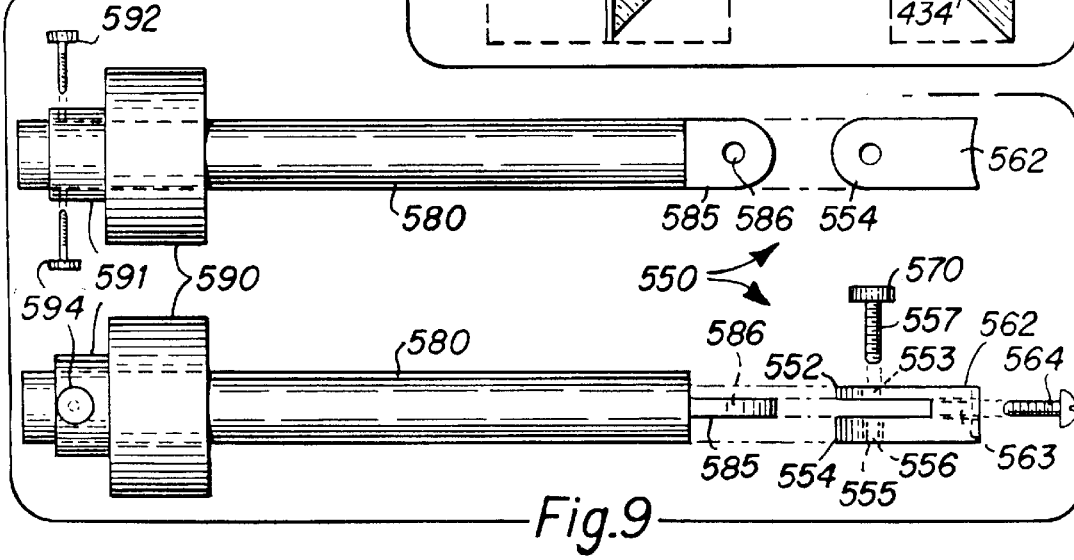

As depicted in FIG. 9, with reference to FIG. 2, back hinge assembly 550 is attached to helmet 100 by bolt 564 engaging thread 563. It comprises dual hinge brackets 552 and 554 with coaxial holes 553 and 555, with hole 555 carrying a thread 556. Lever 580 has at one end a bracket 585 with center hole 586. Lever 580 can be attached to helmet 100 by inserting bracket 585 between brackets 552 and 554, then inserting bolt 570 with thread 557 through hole 553 into hole 555 to engage thread 556. Counterweight 590 has a bushing 59 1with threaded holes for radial screws 592 and 594 and is designed to slide along the length of lever 580 and to be fastened to it by the friction of tightened screws 592 and 594. By adjusting the distance of counterweight 590 from the helmet 100 along lever 580, secured by a tightening of screws 592 and 594, the viewer can adjust counterweight 590 to move the center of gravity of the viewing equipment 10 horizontally. By adjusting the angle of lever 580 relative to helmet 100 via tightening of bolt 570 he can adjust the center of gravity of the viewing equipment vertically for comfort and ergonomics, preferably near the center of the atlas vertebra at the top of his spine. For convenient viewing of the sky area between about 30 degrees of inclination and the zenith, the angle between the axes of the first pair of apertures through the centers of the objective lenses and the second pair of apertures of the mirror housing into the centers of the prism housing inlets can be advantageously fixed at about 60 degrees. The plane of the mirror surface is spanned between the two intersections of the first axes of the first pair apertures and the second axes of the second pair of apertures, that is between the apexes of the resulting equal angles. If mirror 308 is in the correct position the angle between the first axes and the second axes is halved by a plane perpendicular to the mirror surface. Since the angle between the first axis of first apertures and the second axis of the second apertures of housing 300 is fixed by design, the required angle of the plane of the surface of mirror 308 in relation to the second axis is also fixed, making knob 318 expendable. In the present embodiment this angle is about 30 degrees. Painting the inside of all optical pathways black helps to eliminate stray radiation. Both pairs of apertures 310, 320, 340 and 350 of mirror housing 300 also serve as optical baffles, being of a smaller diameter than the attached tubes 210, 220 or the attached tees 342,352, respectively. Mirror housing 300, outer tubes 210, 220 and tees 342,352 can be formed concurrently by injection molding. The roles of inner and outer tubes can be interchanged with inner tubes 212, 222 being attached to mirror housing 300 and outer tubes 210, 220 carrying objective lenses 218,228. Hinge assemblies 105 and 550 can also be implemented in other forms, e.g. as ball and socket arrangements.

A recommended procedure for adjusting the equipment for viewing is:
 a) initially the user wearing helmet 100 can hold assembly 200 with one hand in a position for a light but still comfortable pressure on the bone structure around his eyes and concurrently tighten bolt 130 of hinge 105 with the other hand, thus accomplishing a convenient and effective positioning of assembly 200 relative to helmet 100 and thus to the viewer's head;
 b) in order to balance the weight on his forehead the viewer holds lever 580 in a horizontal position while tightening bolt 570 of hinge 550;
 c) with helmet 100 off or with the help of another person counterweight 590 is shifted along lever 580 and tightened using screws 592, 594 to shift the center of gravity of assembly 200 horizontally;
 d) the viewer holds lever 580 at an appropriate angle while tightening bolt 570 to shift the center of gravity of assembly 200 vertically;
 e) the viewer may have to repeat steps c) and d) to shift the center of gravity over his spine in balance for viewing comfort.

By tilting his head 30 degrees up and down from the horizontal the viewer can scan the sky from about 30 to 90 degrees. The image orientation for panning left and right is preserved in a natural way by the lens and prism arrangement of assembly 200.

Although the present invention has been described in terms of the presently preferred embodiment, it is to be understood that such disclosure is not to be construed as limiting. Various alterations and modifications will no doubt become apparent to those skilled in the art after having read the above disclosure. Thus, it is intended that the appended claims be interpreted as covering all alterations and modifications as fall within the true spirit and scope of the invention.

What is claimed is:

1. A viewing instrument, comprising
 a frame (100) adapted for wearing as headgear;
 a housing (300) having a first pair of apertures (310, 320), a second pair of apertures (340, 350), and at least one reflecting surface (308) for reflecting light between the pairs of apertures;
 a pair of parallel, connected, optically separate pathways (210, 212, 220, 222) affixed to the first pair of apertures, each pathway having a concentric objective lens (218, 228) for focusing light beams from an observable object;
 a first fastener (105, 250), for pivotally affixing the pair of pathways to the frame at an adjustable position;
 a pair of optical offsets (410, 420), having a pair of inlets (413,423) fastened to the housing at the second pair of apertures (340, 350), a pair of outlets (414, 424), the pair of optical offsets parallel offsetting incident light beams; and
 a pair of eye pieces (510, 520), connected to the pair of optical offsets (410, 420) at the pair of outlets (414, 424).

2. The viewing instrument of claim 1, wherein
the optical pathways are mounted onto a base plate (250) connected to the frame.

3. The viewing instrument of claim 1, wherein
the frame has a second fastener (550) in a backward position for pivotally affixing a lever (580) with a slidingly attachable counterweight (590) for shifting a center of gravity of the viewing instrument for viewing comfort.

4. An viewing instrument, comprising
a frame (100) adapted for wearing as headgear;
a housing (300) having a first aperture (310) (340) with an first axis, a second aperture (340) (310) with a second axis intersecting the first axis, and at least one reflecting surface (308), positioned within the housing, for reflecting light between the apertures along their axes, the angle between the first axis and the second axis being less than one hundred eighty degrees;
an optical pathway (210, 212) affixed to the first aperture, the pathway having a concentric objective lens (218) for focusing light beams from an observable object;
a first fastener (105), for pivotally affixing the pathway to the frame at an adjustable position; and
an eye piece (510), connected to the housing (300).

5. The viewing instrument of claim 4, wherein
the optical pathway is mounted onto a base plate (250) connected to the frame (100).

6. A helmet-mounted binocular viewing instrument, comprising
a helmet (100), having a front, with a first pair of brackets (112, 113 and 116, 117), and a back and being adapted for wearing as head gear;
a pair of tubes (210, 220), each with a concentric objective lens (218, 228), being mounted on a second pair of brackets (240, 242) for engaging the first pair of brackets;
a bolt (130) for pivotally securing the first pair of brackets to the second pair of brackets;
a mirror housing (300) with sidewalls (302, 304), having a mirror (308) with an axis (315) fastened to the sidewalls, and having a first pair of apertures (310, 320) with third axes, around each of which are fastened a respective one of the pair of tubes (210, 220), the housing also having a second pair of apertures (340, 350) with fourth axes intersecting the third axes, around which are fastened respective ones of a pair of threaded tees (342, 352), the mirror being positioned for reflecting light between the apertures along their axes, the angle between the third axes and the fourth axes, respectively, being less than one hundred eighty degrees;
a pair of prism housings (410, 420), each having an inlet cavity (423) for receiving a flange (417, 427) with an inlet axis, rotatably attached to a respective one of the housing tees (342, 352) by a threaded collar (418, 428), and each prism housing having an outlet cavity (414, 424) with an outlet axis, and each having a pair of shiftedly offset rectangular prisms (433, 434) providing a parallely offset optical path between the inlet axis and the outlet axis, for individually rotating each prism housing around a respective one of the mirror housing tees (342, 352) for allowing a variable distance between the outlet axis of the prism housings to accommodate a variation in a distance between pupils of different viewers; and
a pair of eyepieces (510, 520) attached to the respective one of the prism housing outlets (414, 424).

7. The viewing instrument of claim 6, wherein
each one of the pair of tubes (210, 220) comprises a set of two slidingly coaxially movable tubes (210, 212, 220, 222), one of the set being fastened to the mirror housing (300) and the other one of the set carrying an objective lens (218, 228), and the set having means (214, 216) for individually adjusting a distance from the objective lens (218, 228) to the mirror (308) for individual focusing the light path from a viewed object into an eye of a viewer.

8. The viewing instrument of claim 7, wherein
the means for adjusting a distance from the objective lens to the mirror comprises a rack (216, 226), attached to one tube of a set, and a pinion (214, 224) with a knob (217, 227) attached to the other tube of a set, the knob being rotatable for moving one tube with its objective lens relative to the other tube being connected to the mirror housing.

9. The viewing instrument of claim 6, wherein
the first pair of brackets (112, 113 and 116, 117) and the second pair of brackets (240, 242) are connected by a bolt (130) engaging a thread (120) in the first pair of brackets for providing a rotationally securable adjustment of the tubes for holding the viewing instrument in place in reference to a head of a viewer.

10. The viewing instrument of claim 6, wherein
each one of the pair of eye pieces (510, 520) carries a ringlike foam shield (620) for cushioning the viewing equipment against a facial bone structure of a viewer and for obstructing stray light, the foam shields having perforations for ventilating perspiration in order to prevent the eye pieces from fogging up.

11. The viewing instrument of claim 6, wherein
a back hinge assembly (550) is affixed to the back of the helmet (100), comprising a dual bracket (552, 554) with concentric holes, one carrying a third thread (556), for receiving a lever bracket (585), and a bolt (570) with a thread (557) for insertion through the holes (553, 555) of the dual bracket and for engaging the third thread (556) for forming a rotatable connection to the helmet (100).

12. The viewing instrument of claim 11, wherein
a lever (580) is connected to the lever bracket (585), carrying a slidable counterweight (590) with a bushing having at least one radial threaded hole for receiving a screw (592, 594), for enabling a viewer first to tighten the hinge bolt (570) with the lever (580) at an approximately horizontal angle, then to slide the counterweight (590) along the lever for shifting a center of gravity of the viewing instrument approximately horizontally for viewing comfort, followed by tightening the screw (592, 594) to hold the counterweight (590) in place.

13. The viewing instrument of claim 12, wherein
the lever (580), with the counterweight (590) affixed and with bolt (570) loosened, is rotated around the axis of back hinge assembly (550) by an angle relative to the helmet (100), for shifting the center of gravity of the viewing instrument approximately vertically for viewing comfort, followed by tightening of the bolt (570) to hold the lever (580) in place.

14. The viewing instrument of claim 6, wherein
means are provided for affixing the viewing instrument to the head of a viewer, comprising at least one adjustable strap (106) under the chin of the viewer, attached to the viewing instrument on both sides for stability.

15. A method for viewing objects in the sky, comprising the steps of
  a) providing a helmet (100), with a front hinge (105), worn by a viewer;
  b) providing a mirror housing (300), holding a coaxial mirror (308), with a first and a second pair of apertures (310, 320 and 340, 350), with a first and a second pair of axes, and a pair of pathways (210, 220), each with an objective lens (218, 228) at a first end, and each being attached at a second end to the first pair of apertures;
  c) providing a base plate (250) attached to the pair of pathways, with brackets for attaching the base plate to the hinge (105);
  d) providing a second pair of optical pathways (342, 352) with pair of first ends attached to the second pair of apertures (340, 350) of the mirror housing, the second pair of axes intersecting the first pair of axes at a pair of respective angles of less than one hundred eighty degrees;
  e) providing a pair of connectors (418, 428) attached to the second ends of the pair of second pathways;
  f) providing a pair of optical offset housings (410, 420), having a pair of inlets (413, 423) with respective inlet axes, rotatably fastened to corresponding ones of the pair of connectors (418, 428), and having a a pair of outlets (414, 424) with respective outlet axes, for parallel offsetting the inlet axes from the outlet axis and by individually rotating the offset housings around respective ones of the pair of connectors for allowing a variable distance between respective ones of the pair of outlet axes to allow adjusting the distance between the respective ones of the outlet axes to the distance between pupils of the viewer; and
  g) providing a pair of eye pieces received by corresponding ones of the pair of outlets of the offset housings.

16. The method of claim 15, further comprising the steps of
  a) providing an angle of about 60 degrees between the axes of the first pair of apertures (310, 320) and the axes of the second pair of apertures (340, 350);
  b) holding the optical assembly (200) with a hand in a position for a comfortable weight distribution to a facial bone structure of a viewer and tightening the bolt (130) of the front hinge assembly (105) with the other hand;
  c) holding the lever with the counterweight with one hand and using an other hand for tightening hinge bolt (570) and counterweight screws (592, 594); and
  d) providing foam shields (620) around the eyepieces (510, 520) for comfortable weight distribution of the optical assembly (200) to a facial bone structure of a viewer.

\* \* \* \* \*